July 29, 1958  R. E. RAWLINS  2,845,619
TARGET IDENTIFICATION DISCRIMINATOR
Filed Aug. 22, 1955  3 Sheets-Sheet 1

INVENTOR.
ROBERT E. RAWLINS
BY
Agent

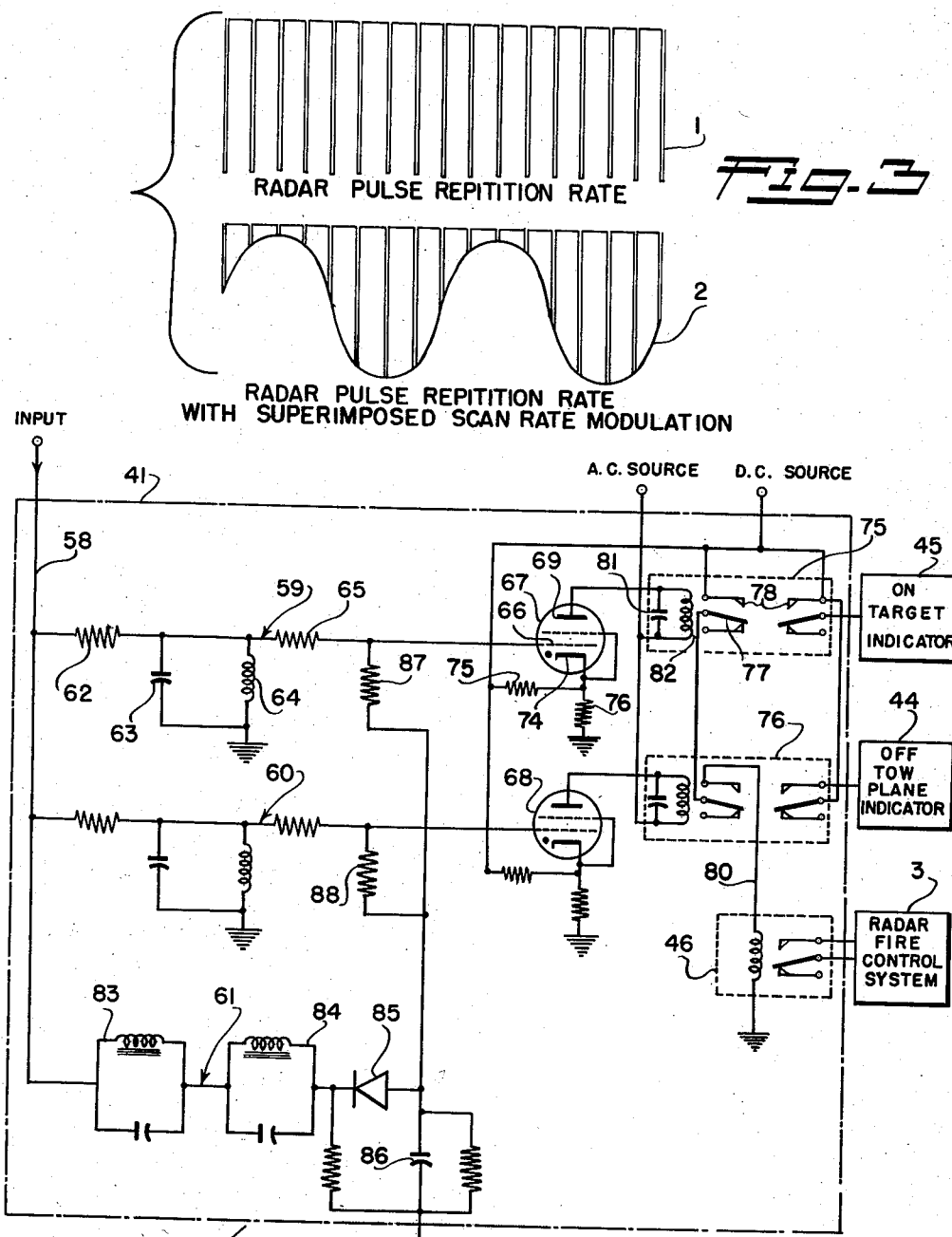

United States Patent Office 2,845,619
Patented July 29, 1958

2,845,619
TARGET IDENTIFICATION DISCRIMINATOR

Robert E. Rawlins, North Hollywood, Calif., assignor to Lockheed Aircraft Corporation, Burbank, Calif.

Application August 22, 1955, Serial No. 529,751

10 Claims. (Cl. 343—6)

This invention relates, generally, to echo type electronic fire control and object detection systems and, more particularly, to a discriminator for identifying which of several airborne targets in the same vicinity is being tracked by a radar device.

Airborne electronic fire control systems have developed to the point where visual contact between the attacking plane and the target is no longer always practicable. Pilots are generally required to rely entirely upon instruments for guidance when making an attack. A technique was devised to evaluate these new electronic fire control systems under simulated combat conditions. This technique consists of making high altitude firing runs on a fast moving tow target which is connected to a tow plane by a long cable. During the firing run the pilot relies upon radar steering signals until after firing is completed. It has been found that with as much as 5000 feet of cable between the target and the tow plane, the normal fire control radar cannot separate the target and tow plane at radar ranges greater than approximately 20,000 yards. Tow plane-target angular separation improves as the range decreases but the radar occasionally jumps target "lock-on" and locks on to the tow plane. If the pilot is not warned that a "jump lock" has occurred the firing run is made on the tow plane instead of the target.

An object of this invention is to provide a discriminator which will furnish signals to the attack plane and actuate an electrical interlock preventing the firing of rockets or guns when the radar is locked on any object other than the tow target.

Another object of this invention is to provide a radar identification discriminator which is highly dependable in operation and which may be packaged within a relatively small space.

Still another object of this invention is to provide a target identification discriminator which operates on the received signal from the fire control radar device to provide voltage outputs which are operated on by a simple passive network to indicate when the aiming error angle of the radar device falls below a predetermined value.

Still another object of this invention is to provide a radar identification discriminator circuit which while being responsive to the radar received signal provides an output which is independent of range and is a function only of the aiming error angle.

Further and other objects will become apparent from a reading of the following detailed description, especially when considered in combination with the accompanying drawing wherein like numerals refer to like parts.

In the drawing:

Figure 3 illustrates typical wave forms of the transmitted and received radar energy; and Figure 4 is a circuit schematic of the tone separator.

In order to effect an understanding of this invention it is necessary to consider the several functions which influence the wave form of the electromagnetic energy after it is transmitted by a fire control system radar device. Referring to Figure 3, it is shown that the transmitted energy level as represented by pulses 1, is substantially constant at the emitting point or transmitting antenna. Still referring to Figure 3, it is seen that the energy level of the transmitted pulses from the radar device may vary, as indicated by the envelope 2, at a target within the radar search sector. This modification of the transmitted energy level is brought about by the dissipation of energy as it moves through the atmosphere and also by shifting the directional energy beam relative to the target or location at which the radar energy is detected.

The average level of the transmitted radar energy at the remote target varies only as a function of range or line of sight distance from the radar device for a given error angle. This may be expressed in equation form as:

$$V_c = f(R) \qquad (1)$$

where $V_c$ represents the average amplitude of the received radio frequency pulses from the radar device and R represents range.

The amplitude of modulation envelope 2 appearing on the received radar energy varies as a function of both range and aiming error angle. This may be expressed in equation form as:

$$V_m = f(R)(\epsilon) \qquad (2)$$

where $V_m$ represents the amplitude of the modulation envelope, R represents range and $\epsilon$ represents the aiming error angle of the radar device.

It is clear from Equation 2 that while the amplitude of the modulation envelope varies with range, the ratio of $V_m/V_c$ which gives the percentage of modulation, varies only with the aiming error angle of the radar device, since the range functions cancel.

Figure 1:
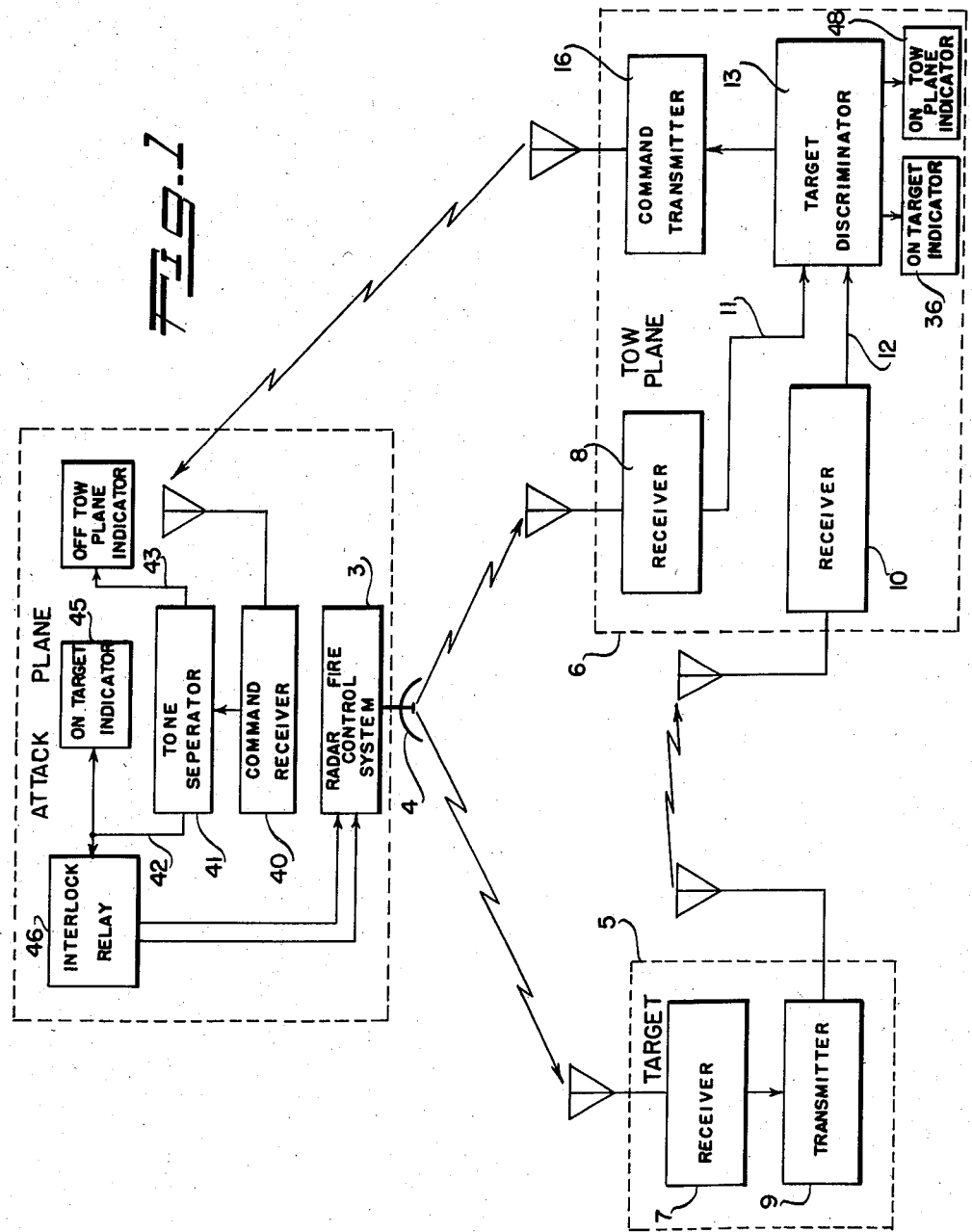
Figure 1 is a block diagram showing a typical system incorporating the target identification discriminator.

The discriminator of this invention mechanizes these equations to provide positive identification of a target as opposed to its tow plane or any other energy reflective object within the search sector of the radar device. Referring to Figure 1, the attack plane carries a suitable radar fire control system 3 having a directional antenna 4 for launching electromagnetic energy forwardly in a narrow beam. The energy beam is moved by antenna 4 to cover a selected search sector. Reflective objects within the search sector, such as target 5 and tow plane 6, will receive a portion of the transmitted energy as the beam sweeps.

To analyze the wave form of the energy received at both the target and tow plane, receivers 7 and 8 are carried by the target and tow plane respectively. The energy detected by receiver 7 in target 5 is fed to a transmitter 9 for broadcasting at a different frequency to a receiver 10 in tow plane 6 completing a communication link from the attack plane to the tow plane via target 5. Receivers 8 and 10 in tow plane 6 provide inputs 11 and 12 to the target discriminator 15 wherein the inputs represent the wave form of the energy at both the tow plane and target.

Figure 2:
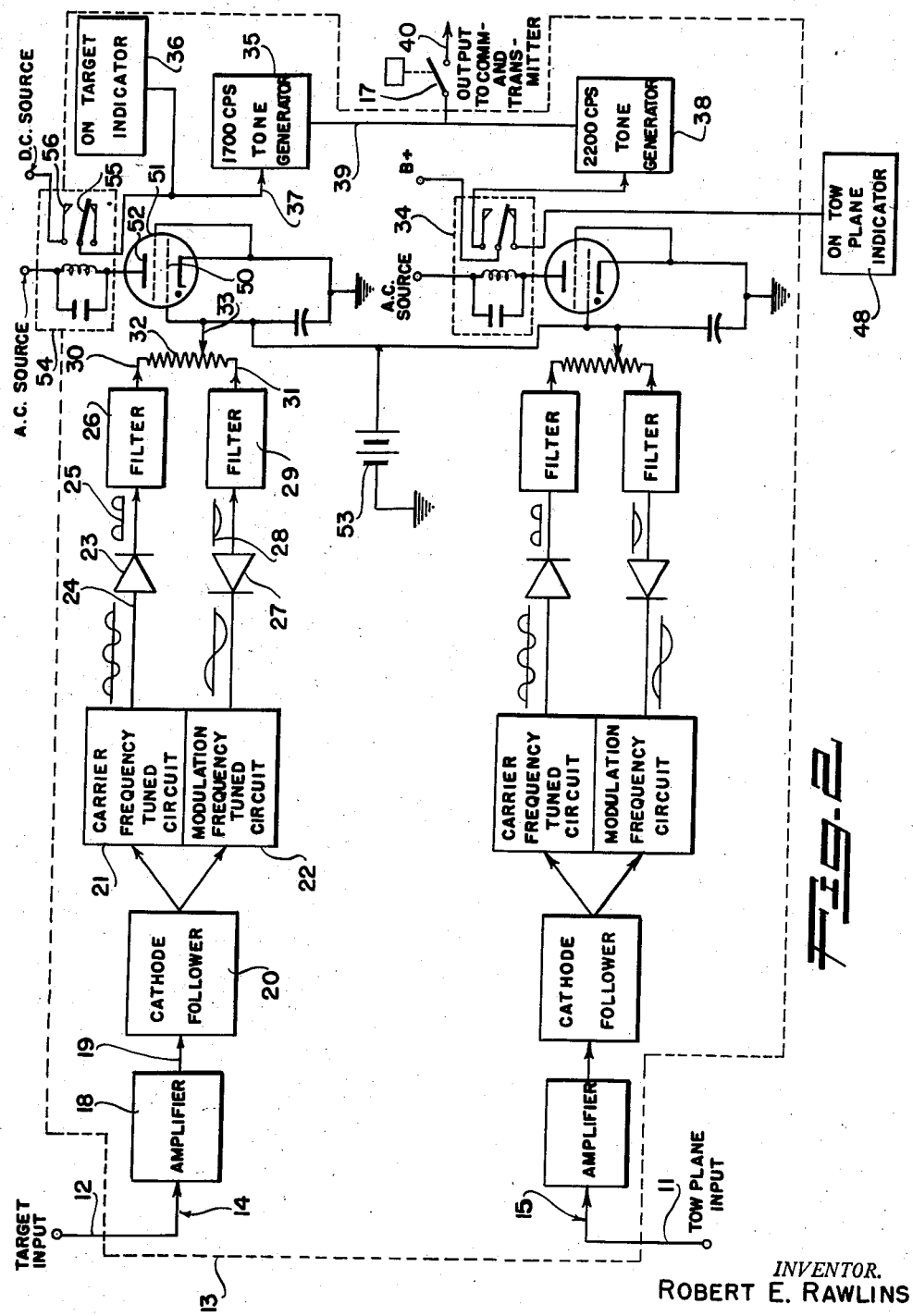
Figure 2 is a block diagram showing the circuitry of the target discriminator per se.

Target discriminator 13 includes two channels 14 and 15 which are coupled at their outputs to a command transmitter 16 carried by tow plane 6 through switch 17, as best shown in Figure 2. Each channel 14 and 15 in discriminator 13 includes an amplifier 18 into which is fed the radar signals transmitted by the attack plane fire control system as detected by receiver 8 or receivers 7 and 10. The output 19 of the amplifier is applied to a cathode follower 20 to provide a low impedance output for driving a pair of tuned circuits 21 and 22. The tuned circuits may be of any conventional design wherein one is selected for resonance at the pulse repetition frequency of the carrier signal transmitted by the radar device in the attack plane and the other is selected for resonance at the scan frequency of the radar device antenna (frequency of the modulation envelope 2 as shown in Figure 3). The output of tuned circuit 21 is thereby made proportional in amplitude to the amplitude of the radio frequency pulse energy transmitted by the radar device and tuned circuit 22 provides an output, the amplitude of which is proportional to the amplitude of the modulation enevelope on the transmitted radar pulse energy.

A rectifier 23 connects with the output of tuned circuit 21 through lead 24 to provide a plurality of positive pulses as indicated at 25. The positive pulses from rectifier 23 are applied to a suitable filter 26 and smoothed to provide a D. C. voltage, the level of which is proportional to the amplitude of the radio frequency pulse energy received at target 5 or tow plane 6, depending upon whether reference is being made to channel 14 or 15.

The output of tuned circuit 22 is applied to a rectifier 27 to provide a series of negative pulses as shown at 28, the amplitude of which is proportional to the amplitude of the modulation envelope on the radio frequency energy driving its associated tuned circuit 21. The negative pulses from the output of rectifier 27 are applied to a suitable filter 29 and smoothed to provide a D. C. voltage representing the average amplitude of the negative pulses and hence the amplitude of the modulation envelope.

Outputs 30 and 31 from filters 26 and 29 respectively are applied to a variable potentiometer 32. By proper adjustment of pickup arm 33 on potentiometer 32, a ratioing or division of the voltages at a fixed percentage value may be obtained. Pickup 33 connects with the grid 50 of a thyratron tube 51. The potentiometer detects a predetermined ratio between the output voltages from filters 26 and 29 by providing a zero output at pickup 33, neglecting any supplementary biasing voltage. When the pickup output is positive, the ratio $V_m/V_c$ is greater than the predetermined value and when it is negative the ratio is less than the predetermined value. Thus, by properly biasing the grid of the thyratron such as indicated at 53 in Figure 2, the tube may be made to fire when the voltage from pickup 33 goes positive.

The anode 52 of thyratron 51 connects with a suitable A. C. source as indicated in Figure 2 so that it is self-quenching when the grid voltage drops below the predetermined $V_m/V_c$ value.

By biasing the thyratron to fire when the voltage from pickup 33 goes positive and to shut off when the voltage at pickup arm 33 goes negative, the circuit is made responsive to actuation at a fixed ratio of the direct current voltages from the filters. Since the ratio between the voltages represents the percentage of modulation of the radio frequency carrier signal transmitted by the radar device it also represents the aiming error angle of the antenna with respect to the target in channel 14 and with respect to the tow plane in channel 15. When the aiming error angle is very small, the modulation amplitude on the radio frequency carrier signal transmitted by the radar device is also small and vice versa when the aiming error angle is large. Therefore, the voltage applied to thyratron 51 from potentiometer pickup 33 goes positive when the aiming error angle is less than the predetermined threshold value, indicating that the attack plane radar device is tracking the object associated with the particular channel. When the thyratron control voltage goes negative it indicates that the amplitude of the modulation envelope is greater than the threshold value and hence the attack plane radar is not tracking the object.

A relay 54, connected in series with anode 52, is energized when thyratron 51 fires. The pickup arm 55 of relay 54, which is shown in the de-energized condition in Figure 2, moves into engagement with contact point 56 when the relay is energized, completing a circuit between a suitable source of direct current electrical potential, as indicated in the drawing, and a tone generator 35. The tone generator produces a selected characteristic signal, such as a sinewave at 1700 cycles per second, for example, when driven by the B+ voltage. Lead 37, which connects relay 34 with tone generator 35, also connects with an "on target" indicator 36 to provide tracking information at the tow plane. When the attack plane radar "locks on" the target, relay 54 will be energized by the thyratron tube to apply a driving voltage to both tone generator 35 and "on target" indicator 36.

A thyratron controlled relay 34 like that described above for channel 14, is also employed in tow plane channel 15. The only real difference between the two relay circuits in the discriminator is that relay 34 couples tone generator 38 with the direct current source when de-energized and "on tow plane" indicator 48 with the direct current source when energized. Tone generator 38 produces a characteristic signal such as a sinewave at a frequency different from that of the signal from tone generator 35.

Tone generator 35 in channel 14 is coupled with the output of tone generator 38 in channel 15 by lead 39 to provide at the output 40 of the discriminator, two distinct signals, one representing an indication that the attack plane radar device is tracking the target and another signal indicating that the attack plane radar device is not tracking the tow plane. By use of this dual signal system the reliability of the discriminator device is greatly increased.

The proper or safe-to-fire output from discriminator 13 is a signal from both tone generators 35 and 38, each of which operate at different frequencies such as, for example, 1700 cycles per second for "on-target" tone generator 35 and 2200 cycles per second for the "off-tow plane" tone generator 38. The signals from the tone generators are applied to the command transmitter 16 and radioed to a command receiver 40 in the attack plane. The output from command receiver 40 is applied to a tone separator circuit 41 to provide a voltage output through leads 42 and 43 to an interlock relay 46, to an "on-target" indicator 45 and to an "off-tow plane" indicator 44. A voltage through leads 42 and 43 from tone separator 41 is obtained only when the fire control system radar is locked on the target and off the tow plane, causing both the 1700 cycle per second tone generator 35 and the 2200 cycle per second tone generator 38 in the discriminator to operate. Even if the attack plane radar system is locked on the target, it cannot operate to fire guns or rockets unless a positive indication is also received that it is not locked on the tow plane. This is important to make the system dependable under all conditions, for at extremely long ranges the attack plane radar may appear to be tracking both the target and tow plane.

The circuitry for tone separator 41 and fire control system interlock relay 46 are schematically shown in Figure 4. The signal input 58, obtained from command receiver 40, is applied to three separate channels 59, 60 and 61. Channel 59 may be identified as the "on target" circuit, channel 60 may be identified as the "off tow plane" circuit and channel 61 may be identified as the noise circuit. Channels 59 and 60 each include a band pass filter formed by a resistor 62, a capacitor 63 and an inductance 64. The band pass filter in channel 59 allows only the signal from "on-target" tone generator 35 to pass while the filter in channel 60 allows only the signal from "off-tow plane" tone generator 38 to pass.

The output from the filters in channels 59 and 60 are each applied through an isolating resistor 65 to the grid 66 of a thyratron 67 or 68, one for each channel. The anode 69 of the thyratron is supplied with an alternating current voltage through a coil winding 82 in relay 75 or 76. The cathode 74 on the thyratron is biased slightly positive by resistors 75 and 76 and a suitable source of direct current potential as shown.

When the anode 69 of either thyratron is positive (positive half cycle of the A. C. anode potential) and the peak voltage on grid 66 rises to a predetermined level, the thyratron fires and the associated relay 75 or 76 becomes energized, causing the relay arms 77 to move from the positions shown, to the open contacts 78. The relays 75 and 76 are connected in series with a direct current potential so that an output to interlock relay 46 through lead 80 will be obtained only when both relays are energized. The "on-target" and "off-tow plane" indicators 45 and 44 respectively are operated independently of this interlock circuitry by their associated relay. The function of the indicators in the attack plane as well as those in the tow plane are simply to provide sensory tracking information to the operators.

Capacitors 81 are connected in parallel with relay coils 82 for holding the relays energized only for the short intervals when the thyratrons are cut off due to the presence of the negative half cycle of the alternating current energy at the thyratron anodes.

The noise circuit 61 in tone separator 41 includes a pair of rejection filters 83 and 84 followed by a negative peak detector 85. The input signal to the tone separator enters the rejection filters where the tone generator signals are blocked. The remaining signal which represents noise is passed by the filters and rectified at peak detector 85. This negative direct current voltage is filtered by capacitor 86 and applied to the grids 66 of thyratrons 67 and 68 through mixing resistors 87 and 88 respectively. This negative direct current voltage clamps the zero axis of the alternating current signal obtained from the band pass filter circuits at some negative value which is a function of the amount of noise present in the tone separator input. This arrangement prevents the possibility of noise triggering the tone circuit thyratrons 67 and 68 and giving erroneous indications.

In operation, target discriminator 13 receives the radar transmitted radio frequency carrier signal as detected by receiver 7 in target 5 and receiver 8 in tow plane 6. The received signals are applied to separate channels 14 and 15 in discriminator 13 and operated on in each channel as previously described to provide a pair of direct current voltages of opposite polarity. The level of one of the direct current voltages is proportional to the amplitude of the radio frequency carrier signal and the level of the other is proportional to the amplitude of the modulation envelope appearing on the carrier signal. The direct current voltages in each channel are applied to a voltage dividing potentiometer 32 to control the operation of a thyratron which actuates a relay 34 or 54 as indicated in Figure 2. When the amplitude of the modulation envelope on the radio frequency carrier wave transmitted by the radar device in the attack plane reaches a predetermined minimum percentage level relative to the amplitude of the carrier signal, the thyratron controlled relays are actuated to provide either a driving voltage to tone generator 35 and tone generator 38, indicating that the radar device is tracking the target or a driving voltage to "on-tow plane" indicator 48 indicating that the radar device is tracking the tow plane.

Switch 17 in the discriminator is normally closed, allowing the outputs from the tone generators to be transmitted to the attack plane command receiver 40 to actuate "off-tow plane" indicator 44, "on-target" indicator 45 and relay 46. The attack plane operator is thereby provided with positive target identification information and the fire control system is automatically held inoperative unless both "on-target" and "off-tow plane" signals are received simultaneously.

The attack may be terminated at any stage by the tow plane operator by simply opening switch 17 and thereby de-coupling the communication link from the tow plane to the attack plane.

The "on-target" "off-tow plane" signal combination dependably prevents inadvertent firing at the tow plane as well as at other objects not the target but in the same area.

While a ratio of the direct current voltages is obtained by a passive type network in the discriminator as shown in Figure 2, it should be understood that any type of ratioing circuit may be employed without departing from the teachings of this invention so long as a control signal output is obtained at a predetermined threshold ratio.

The discriminator has been described herein in connection with an aircraft fire control system. This is for purposes of illustration rather than limitation. It obviously is also useful in other applications such as in anti-aircraft ground equipment to avoid shooting at friendly aircraft when the desired target is in the same vicinity.

While a specific arrangement has been shown and described it should be understood that certain alterations, modifications and substitutions such as those suggested hereinabove may be made to the instant disclosure without departing from the spirit and scope of the invention as defined by the appended claims.

I claim:

1. In an aircraft fire control training system employing a radar equipped attack plane, a tow plane and a tow target pulled by the tow plane, a target-tow plane identification discriminator comprising, a transponder carried by the target for receiving the radio frequency energy reaching the target from the radar equipped attack plane and transmitting a similar signal at a different radio frequency, receiver means carried by the tow plane and being responsive to both the transmitted energy signals from the radar equipped attack plane and the transmitted energy signal from the target transponder, a two channel filter network connecting with said receiver means, each channel including a pair of bandpass filters responsive to only one of the received energy signals, one of said filters providing an output representing the amplitude of the modulation envelope on the received energy signal and the other of said filters providing an output representing the amplitude of the received energy signal itself, rectifier means connecting with the outputs from said filters and providing direct current signals of opposite polarity, potentiometer means responsive to the direct current signals in each channel and providing a control signal at a predetermined ratio of the direct current signals whereby to distinguish between the target and tow plane, and means carried by the attack plane and responsive to the control signals for rendering the fire control system operative only when the attack plane is tracking the target.

2. In an aircraft fire control training system employing a radar equipped attack plane, a tow plane and a tow target pulled by the tow plane, a target-tow plane identification discriminator comprising, a transponder carried by the target for receiving the radio frequency energy reaching the target from the radar equipped plane and transmitting a similar signal at a different radio frequency, receiver means carried by the tow plane and being responsive to both the transmitted energy signals from the radar equipped attack plane and from the target transponder, a two channel filter network connecting with said receiver means, each channel including a pair of band pass filters responsive to only one of the received energy signals, one of said filters providing an output representing the amplitude of the modulation envelope on the received energy signal and the other of said filters providing an output representing the amplitude of the received energy signal itself, rectifier means connecting with the outputs from said filters and providing direct current signals of opposite polarity, potentiometer means responsive to the direct current signals in each channel and providing a control signal at a predetermined ratio of the direct current signals whereby to differentiate between the target and tow plane, and means carried by the attack plane and responsive to the control signals providing positive target identification.

3. A target discriminator for identifying which of several targets in the same vicinity is being tracked by a radar device comprising, transponder means carried by at least one of said targets for re-transmitting the radio frequency energy received from the radar device at a frequency different from the received radio frequency, receiver means responsive to the re-transmitted energy from said transponder means, a pair of tuned circuits connecting with said receiver means and being responsive to the re-transmitted radio frequency energy, one of said tuned circuits providing an output proportional to the amplitude of said radio frequency energy, the other of said tuned circuits providing an output proportional to the amplitude of the modulation envelope appearing on said re-transmitted radio frequency energy, means responsive to the outputs from said tuned circuits and providing an information output only in response to a predetermined ratio between the tuned circuit outputs indicating a selected aiming error angle of the radar device, and means responsive to said information output for identifying the particular target at said radar device.

4. A target discriminator for identifying which of several targets in the same vicinity is being tracked by a radar device comprising, transponder means carried by at least one of said targets for re-transmitting the radio frequency energy received from the radar device at a frequency different from the received radio frequency, receiver means responsive to the re-transmitted energy from said transponder means, a pair of tuned circuits connecting with said receiver means and being responsive to the re-transmitted radio frequency energy, one of said tuned circuits providing an output proportional to the amplitude of said radio frequency energy, the other of said tuned circuits providing an output proportional to the amplitude of the modulation envelope appearing on said retransmitted radio frequency energy, means responsive to the outputs from said tuned circuits and providing an information output only in response to a predetermined ratio between the tuned circuit outputs indicating a selected aiming error angle of the radar device, means connecting with said last mentioned means and transmitting said information output to said radar device, and receiver means responsive to the transmitted information output providing target identification at said radar device.

5. A target-tow plane identification discriminator for use with radar fire control devices and the like comprising, receiver means carried in both the target and tow plane for detecting energy transmitted by the radar device, filter means responsive to the detected energy from said receiver means, said filter means providing separate voltages representing the amplitude of the modulation envelop on the detected energy and the amplitude of the detected energy itself for both the target and tow plane, comparator means responsive to the separate voltages from said filter means and providing an output signal whenever the percentage of modulation of the detected energy at the target and tow plane reaches a predetermined level, and means responsive to the comparator means output signal and identifying which of the two objects is being tracked.

6. A target discriminator for determining which of several targets in the same vicinity is being tracked by a remotely located radar device comprising, means carried by each target for detecting the radio frequency energy transmitted by the radar device, means responsive to the last mentioned means and generating a pair of signals from the detected radio frequency energy, one of the pair of signals representing the amplitude of the radio frequency energy, the other of the pair of signals representing the amplitude of the modulation envelope on the radio frequency energy, and means connecting with said last mentioned means and providing a sensory output in response to a predetermined ratio between the pair of signals from each of the several targets, distinguishing one from the other.

7. A discriminator for indicating which of a plurality of targets is being tracked by a radar device comprising, receiver means detecting the radar signal at each of the plurality of targets, means connecting with said receiver means and responsive to the detected radar signals to develop a voltage proportional to the detected radar signal average amplitude for each of the plurality of targets, means connecting with said receiver means and responsive to the detected radar signals to develop a voltage proportional to the amplitude of the scan frequency modulation on the radar signal for each of the plurality of targets, and comparator means responsive to said voltages and providing an output in response to a predetermined ratio of the magnitudes thereof indicating the particular target being tracked.

8. An object discriminator for a system employing a projectile launching device, an echo type remote object locating device for aiming the projectile launching device and a plurality of remote objects only one of which is to be fired upon comprising, transponder means carried by at least one of the remote objects for receiving and re-transmitting echo energy, ratio means responsive to the re-transmitted echo energy from said transponder means and providing an output representing the percentage of modulation of the re-transmitted echo energy, tone generator means responsive to said output and producing a characteristic signal only when a predetermined percentage of modulation of the echo energy exists, and control means responsive only to the characteristic signal for producing a safe-to-launch output.

9. An object discriminator for a system employing a projectile launching device, an echo type remote object locating device for aiming the projectile launching device and a plurality of remote objects only one of which is to be fired upon comprising, receiver means carried by the remote objects and detecting the echo energy at at least two of the plurality of objects, ratio means responsive to the detected echo energy from each said receiver means and providing outputs representing the percentage of modulation of the detected echo energy, tone generator means responsive to said outputs and producing characteristic tone signals for the associated objects only when a predetermined percentage of modulation of the echo energy exists whereby a known plurality of characteristic tone signals are produced simultaneously when the device is properly aimed, and launch control means responsive to the simultaneous application of said known characteristic tone signals to produce a safe-to-launch output.

10. An object discriminator for a system employing a projectile launching device, an echo type remote object locating device for aiming the projectile launching device and a plurality of remote objects only one of which is to be fired upon comprising, transponder means carried by at least one of the remote objects and detecting the echo energy at the associated object, receiver means carried by one of the remote objects and detecting echo energy, ratio detector means electrically coupled to said transponder means and said receiver means and providing outputs in response to detected echo energy having a predetermined percentage of modulation, tone generator means responsive to said outputs and producing characteristic tone signals distinguishing the associated objects, and launch control means responsive only to the simultaneous application of said characteristic signals to produce a safe-to-launch output.

No references cited.